United States Patent [19]

Horine

[11] Patent Number: 4,629,297
[45] Date of Patent: Dec. 16, 1986

[54] ACTIVE SECONDARY MIRROR MOUNT

[75] Inventor: Graham A. Horine, San Carlos, Calif.

[73] Assignee: The United States of America as represented by the Secretary of the Air Force, Washington, D.C.

[21] Appl. No.: 779,403

[22] Filed: Sep. 24, 1985

[51] Int. Cl.⁴ .............................. G02B 7/18; G02B 5/10
[52] U.S. Cl. .................................................... 350/632
[58] Field of Search ............... 350/632, 487, 486, 620, 350/619, 639, 637, 505, 504, 611

[56] References Cited

U.S. PATENT DOCUMENTS

| | | | |
|---|---|---|---|
| 2,928,318 | 3/1960 | Friday | 88/93 |
| 3,566,101 | 2/1971 | Hagner | 240/44.1 |
| 3,588,230 | 6/1971 | De Rieux | 350/252 |
| 3,764,934 | 10/1973 | Schamberger | 331/94.5 |
| 3,814,507 | 6/1974 | Osborn et al. | 350/285 |
| 4,151,757 | 5/1979 | Pitrat | 74/501 M |
| 4,171,648 | 10/1979 | Manzoni | 74/60 |
| 4,500,170 | 2/1985 | Montesanto | 350/611 |

Primary Examiner—Jon W. Henry
Attorney, Agent, or Firm—Stanton E. Collier; Donald J. Singer

[57] ABSTRACT

An active secondary mirror mount is used in a telescope requiring the mount have five degrees of freedom in movement. The spider legs are connected between the telescope tube and a central housing. Within the central housing are two concentrically mounted tubes. The outer tube is fixedly held by the central housing and the inner tube is flexibly held within the outer tube. X-axis and Y-axis actuator rods pass through the spider legs to act upon the inner tube. The inner tube has a focus actuator mounted on one end with an actuator shaft passing through the inner tube to the other end having the secondary mirror mounted thereon. Flexures are mounted to the inner tube and have the actuator shaft passing therethrough.

7 Claims, 5 Drawing Figures

ACTIVE SECONDARY MIRROR MOUNT

STATEMENT OF GOVERNMENT INTEREST

The invention described herein may be manufactured and used by or for the Government for governmental purposes without the payment of any royalty thereon.

BACKGROUND OF THE INVENTION

This invention relates generally to telescopes, and in particular, relates to means for adjusting a secondary mirror therein.

For example, in a Newtonian type of telescope, the secondary mirror is typically mounted on a spider mount having a plurality of legs and a central housing. The secondary mirror is mounted on a platform upon the central housing that may be adjusted to move the secondary mirror. The adjustment may be manually accomplished if the housing is accessible. Manual adjustment may be very time consuming because of repeated adjustments necessary in a trial and error method. Further, if the system is closed, it must be opened and reclosed. Another problem may be the danger to the optical system from dropped objects, finger prints, etc. If the telescope system is placed in space, normally manual adjustment must occur before launch. The secondary may be knocked out of adjustment by vibration, changes in temperature, etc. Even the most ruggedly built system will require minor adjustments in this case.

These drawbacks have motivated a search for an apparatus having the ability of remotely adjusting the secondary mirror.

SUMMARY OF THE INVENTION

The instant invention sets forth an active secondary mirror mount for a telescope.

The mount has a housing that is attached to the telescope tube by eight spider legs. Four of the adjacent legs have actuator rods therein that are connected to external actuators on the telescope tube and to an inner square tube. The inner tube is flexibly mounted to an outer square tube that in turn is fixedly held within the mount housing. The inner tube has two focus flexure supports that hold a focus shaft that acts between the secondary mirror and a focus actuator. By selectively pushing or pulling on the actuator rods within the spider legs the inner tube may be moved in the X-axis or Y-axis direction. Thus there are five degrees of freedom when the focus direction is included.

It is therefore one object of the present invention to provide an active secondary mirror mount; and It is another object of the present invention to provide an active secondary mirror mount having five degrees of freedom.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

Figure 1:
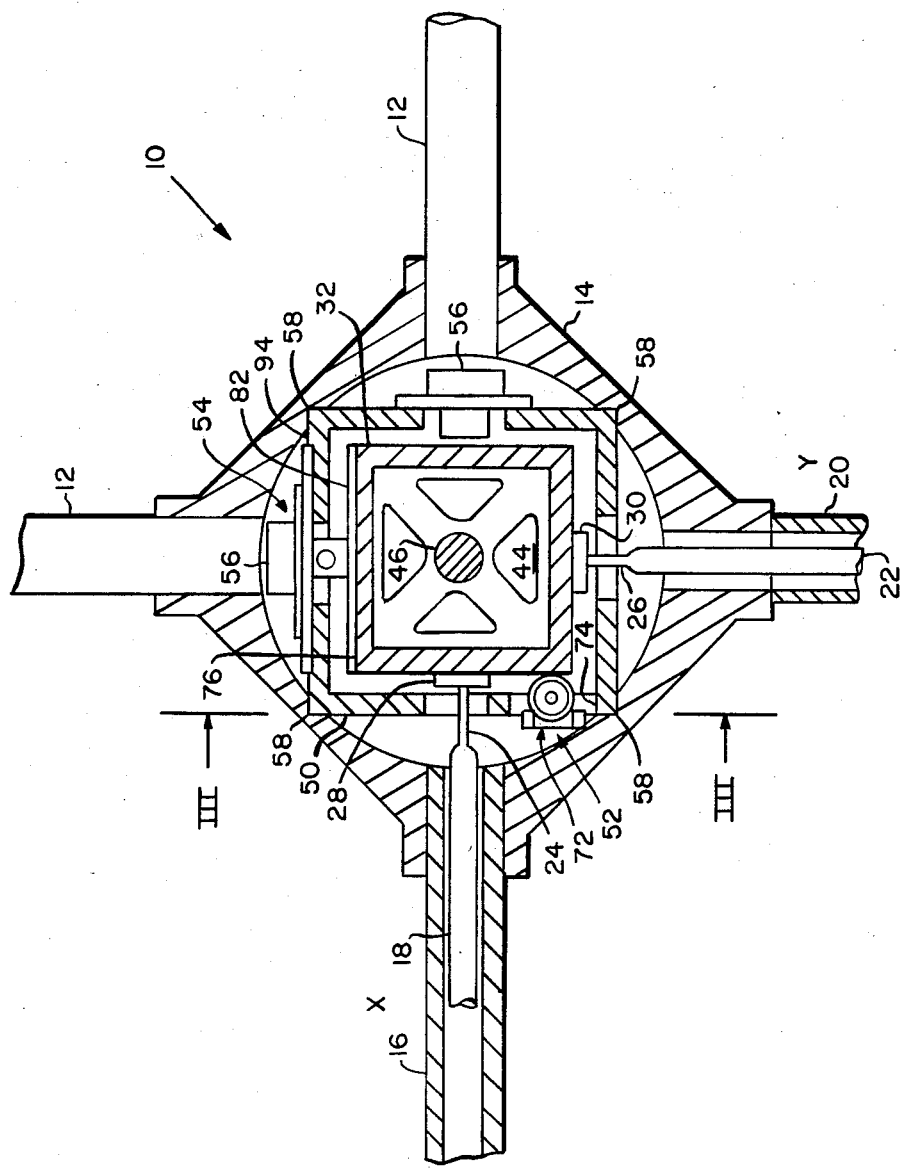
FIG. 1 is a partial transverse cross section of the active secondary mirror mount of the present invention.

Referring to FIG. 1, an active secondary mirror mount 10 is shown in a transverse view cross section. A telescope tube is not shown along with linear actuators attached thereon. It is to be further understood that appropriate electrical wiring is attached where needed. Mirror mount 10 has eight spider legs 12 attached between the telescope tube and a housing 14. As seen in FIG. 1, there is one leg 12 behind each shown. Legs 12 may be hollow so that weight is minimized and so that electrical and mechanical connections may be made therethrough. In particular, legs 16 have linear actuator rods 18 therein for providing X-axis translation. Also, legs 20 have linear actuator rods 22 therein for providing Y-axis translation. Rods 18 and 22 have flexures 24 and 26, respectively, which are thin rods having flat attaching plates 28 and 30, respectively, attached to flexures 24 and 26 and an inner tube 32.

Figure 2:
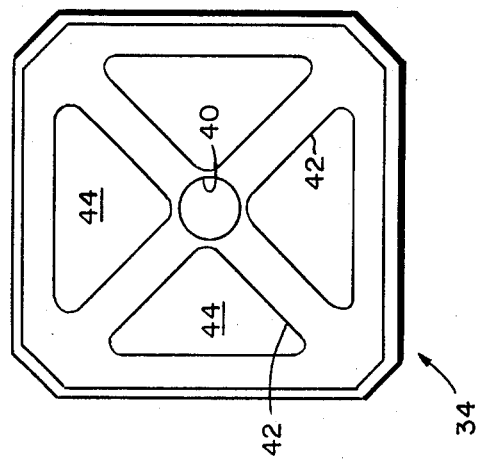
FIG. 2 is an end view of a focus flexure of the present invention.
Figure 4:
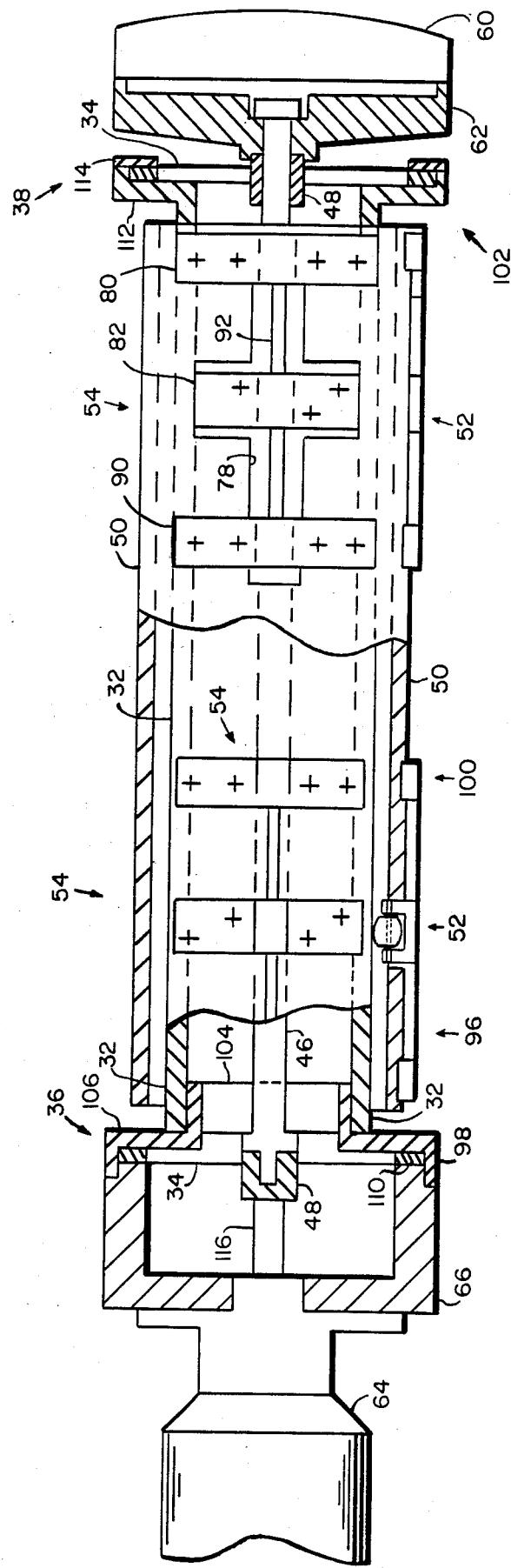
FIG. 4 is a top view with partial cross sections of the outer tube and inner tube of the present invention.

Inner tube 32 is a square shaped metal tube having a focus flexure 34, FIG. 2, on an aft end 36 and on a fore 38 of tube 32, FIG. 4 Focus flexure 34 has a central hole 40 in support arms 42. Support arms 42 having voids 44 thereabout are made of thin material that allows support arms 42 to flex in the direction perpendicular to FIG. 2, this being the Z-axis of mirror mount 10. A focus shaft 46 transverses inner tube 32 and passes through focus flexures 34. Retaining sleeves 48 guide and hold focus shaft 46 in focus flexures 34 and 36.

Inner tube 32 is flexibly held in an outer tube 50 by means of transverse flexures 24 and 26, flexure rollers 52, and longitudinal flexures 54 to be detailed in reference to FIG. 4. Distance sensors 56 provide outputs to determine the amount of X-or Y-axis translation. Outer tube 50 is fixedly held in housing 14 at four points 58.

Figure 3:
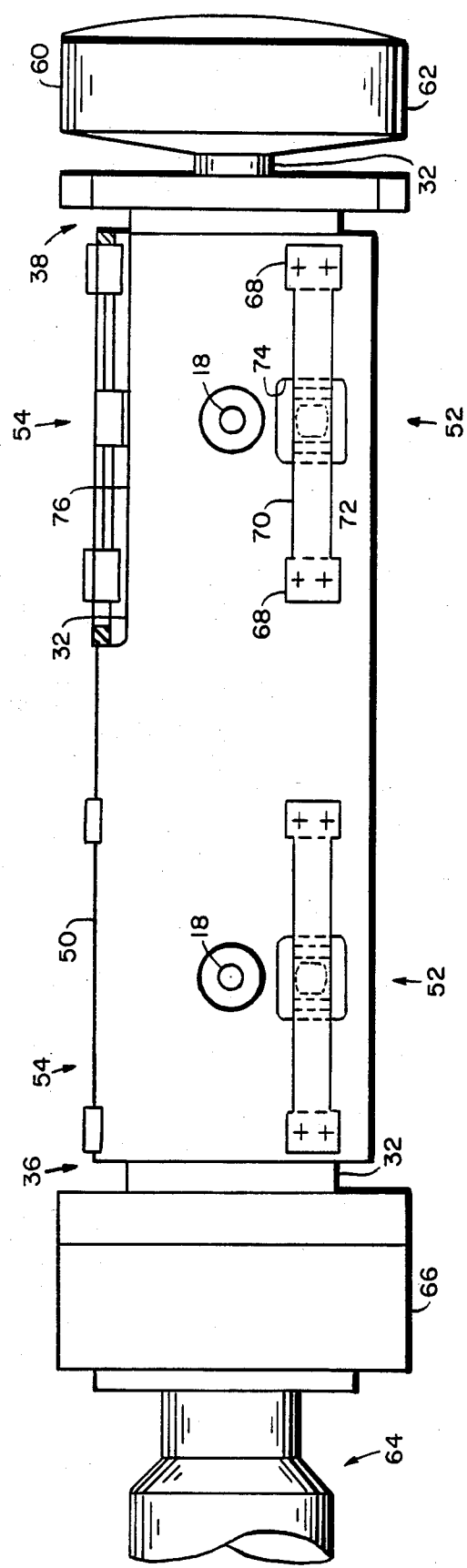
FIG. 3 is a side view of the outer tube of the active secondary mirror mount of the present invention.

FIG. 3 is a side view with partial cross section of FIG. 1 in the direction shown. In FIG. 3, a secondary mirror 60 is held in bracket 62. A linear actuator 64 for focus adjustment is connected to inner tube 32 by an adapter 66.

Roller flexure 52 have attaching end plates 68 that are affixed to outer tube 50, a flexible arm 70 connected between end plates 68, and a roller 72 that is attached to the center of arm 70. Roller 72 is positioned in a hole 74 through outer tube 50 and rotatably rests on the side of inner tube 32 as shown in FIG. 1. As inner tube 32 is moved flexure rollers 52 stabilize tube 32.

On the upper surface 76 of inner tube 32 are two longitudinal flexures 54. The right flexure 54 is shown in side view in FIG. 3, a top view is provided in FIG. 4, and a perspective view in FIG. 5.

Figure 5:
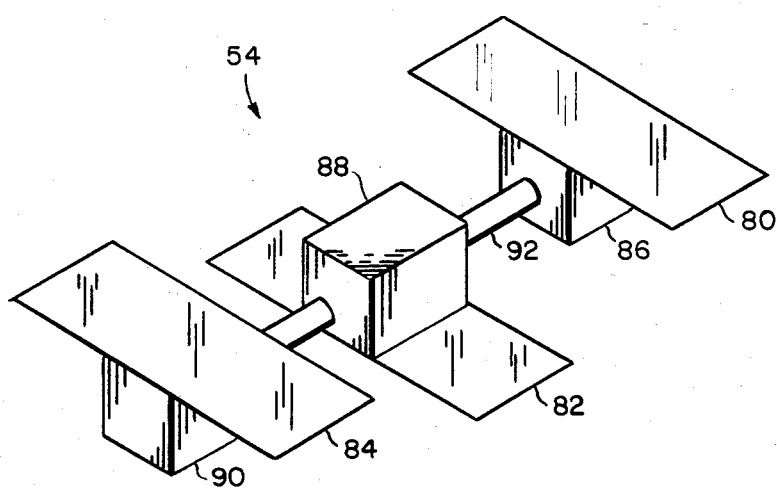
FIG. 5 is a perspective view of the longitudinal flexure connecting the outer and inner tubes of the present invention.

As seen in FIG. 4, a slot 78 is cut through outer tube 50 so that longitudinal flexure 54 can be attached to both outer tube 50 and inner tube 32. In FIG. 5, flexure 54 has a fore attaching plate 80, a mid attaching plate 82, and an aft attaching plate 84. Three brackets 86, 88 and 90 are affixed to plates 80, 82 and 84, respectively, for holding a flexure rod 92. Fore and aft attaching plates 80 and 84 are affixed to a top surface 94 of outer tube 50 and mid attaching plate 82 is affixed to top surface 76 of inner tube 32. Relative movement between outer tube 50 and inner tube 32 is thus permitted with the bending of flexure rod 92. As seen in FIG. 4, there are two longitudinal flexures 54.

Referring to FIG. 4, three different cross sections are shown of tubes 32 and 50. Cross section 96 is of aft end 36 through actuator adapter 66, focus flexure retainer 98, inner tube 32 and outer tube 50 with focus shaft 46 seen therein. Cross section 100 is only through outer tube 50 showing inner tube 32. Cross section 102 is of fore end 38. Section 96 shows focus flexure retainer 98 being held by inner tube 32 and is secured by conventional means.

Retainer 98 has a square tubular base 104 that fits within inner tube 32, a flange 106 attached to base 104, and a lip 108 positioned on flange 106 so that focus flexure 34 fits therein. A spacer 110 allows flexure 34 greater latitude in flexing. Actuator adapter 66 is attached to aft retainer 98 by conventional means. Fore retainer 112 is similarly constructed as aft retainer 98 but a flat ring 114, for example, holds down fore focus flexure 34 by conventional techniques.

Linear actuator 64 being attached to adapter 66 has an actuator shaft 116 bearing upon sleeve 48 with focus shaft 46 therein. At fore end 38 focus shaft 46 passes through sleeve 48 and is fixedly attached to secondary mirror-mount 62.

In operation, translational movement of X-axis actuator rod 16, Y-axis actuator rod 22, and focus shaft 46 provides five degrees of movement to secondary mirror 60 by remote operation. Distance sensors 56 provide necessary information as to the amount of movement.

Clearly, many modifications and variations of the present invention are possible in light of the above teachings and it is therefore understood, that within the inventive scope of the inventive concept, the invention may be practiced otherwise than specifically claimed.

What is claimed is:

1. An active secondary mirror mount for a telescope, said mount comprising:
   a plurality of spider legs for holding said mount within said telescope;
   a housing, said housing fixedly attached to said spider legs, said housing centered within a telescope tube of said telescope and having a void longitudinally therethrough;
   an outer tube, said outer tube being square shaped and fixedly attached within said void to said housing;
   an inner tube, said inner tube being square shaped and selectively positioned within said outer tube;
   a pair of focus flexure retainers, said retainers being fore and aft, said retainers being fixedly attached to a fore and an aft end of said inner tube;
   a pair of focus flexures, said focus flexures being aft and fore, said focus flexures fixedly held within said focus flexure retainers;
   a linear focus actuator, said linear focus actuator fixedly attached to said aft focus flexure retainer, said linear actuator having an actuator shaft acting upon an aft sleeve held within said aft focus flexure;
   a focus shaft, said focus shaft held within said aft sleeve, said focus shaft having an aft and a fore end;
   a secondary mirror holder, said secondary mirror holder fixedly attached to said fore end of said focus shaft, said fore end of said focus shaft passing through a fore sleeve of said fore focus flexure;
   an X-axis actuating means for translating said inner tube;
   a Y-axis actuating means for translating said inner tube;
   roller flexures, said roller flexures connected to said outer tube and rotatably contacting said inner tube;
   longitudinal flexures, said longitudinal flexures connected between said outer tube and said inner tube, said longitudinal flexures allowing limited relative movement between said outer and said inner tubes; and
   distance sensing means, said distance sensing means for measuring the relative X-axis and Y-axis movement between said outer tube and said inner tube.

2. A mount as defined in claim 1 wherein said spider legs number eight, each pair of said spider legs of four pairs being mounted ninety degrees from adjacent pairs, said spider legs being mounted so that only four spider legs are seen in a longitudinal direction of said telescope to minimize interference; one pair of said four pairs having X-axis actuator rods therein, an adjacent pair to said pair having said X-axis actuator rods therein having Y-axis actuator rods therein.

3. A mount as defined in claim 2 wherein said outer tube has holes therethrough for said actuator rods, said roller flexures, and said longitudinal flexures.

4. A mount as defined in claim 3 wherein said focus flexure is square shaped, a thickness of said focus flexure being relatively thin, said focus flexure having voids therethrough for allowing flexing movement of said sleeve mounted in the center thereof.

5. A mount as defined in claim 4 wherein each of said X-axis actuating means comprises an X-axis actuator, said X-axis actuator rod, and a flexure rod attached to said X-axis actuator rod and to said inner tube.

6. A mount as defined in claim 5 wherein each of said Y-axis actuating means comprises a Y-axis actuator, said Y-axis actuator rod, and a flexure rod attached to said Y-axis actuator rod and to said inner tube.

7. A mount as defined in claim 6 wherein each of said longitudinal flexures comprises an aft attaching plate, a mid attaching plate, a fore attaching plate, a bracket mounted to each plate, and a flexure rod mounted between each of said bracket, said mid attaching plate having said bracket oppositely mounted when compared to said fore and said aft plates, said fore and said aft attaching plates mounted to said outer tube and said mid attaching plate mounted to said inner tube.

* * * * *